US012807783B2

(12) United States Patent
Kim et al.

(10) Patent No.: US 12,807,783 B2
(45) Date of Patent: Nov. 24, 2026

(54) METHOD FOR PREPARING RECYCLED ABS RESIN

(71) Applicant: LG CHEM, LTD., Seoul (KR)

(72) Inventors: Do Dam Kim, Daejeon (KR); Sang Ho Lee, Daejeon (KR); Jue Hyung Kang, Daejeon (KR); Jun Sik Kim, Daejeon (KR); Jong Suh Park, Daejeon (KR); Hyun Taek Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 376 days.

(21) Appl. No.: 18/290,852

(22) PCT Filed: Jul. 4, 2023

(86) PCT No.: PCT/KR2023/009381

§ 371 (c)(1),
(2) Date: Jan. 22, 2024

(87) PCT Pub. No.: WO2024/071600

PCT Pub. Date: Apr. 4, 2024

(65) Prior Publication Data

US 2024/0425666 A1 Dec. 26, 2024

(30) Foreign Application Priority Data

Sep. 26, 2022 (KR) ........................ 10-2022-0121688

(51) Int. Cl.
*C08J 11/26* (2006.01)
*B29C 48/00* (2019.01)

(52) U.S. Cl.
CPC .......... *C08J 11/26* (2013.01); *B29C 48/0022* (2019.02); *C08J 2355/02* (2013.01)

(58) Field of Classification Search
CPC ... B29C 48/0022; B29C 48/022; B29B 7/007; B29B 7/38; B29B 7/66; B29B 7/726; B29B 7/823; B29B 7/88; B29B 9/06; B29B 9/12; B29B 11/10; B29B 17/04; C08J 11/22; C08J 11/26; C08J 2355/02; C08J 2375/04; B29K 2055/02; B29K 2075/00; Y02W 30/62
See application file for complete search history.

(56) References Cited

U.S. PATENT DOCUMENTS

| | | | |
|---|---|---|---|
| 2014/0275382 A1 | 9/2014 | Ishida | |
| 2021/0179529 A1* | 6/2021 | Treskow | ................ C07C 69/54 |
| 2021/0380777 A1 | 12/2021 | Côté | |

FOREIGN PATENT DOCUMENTS

| | | | | |
|---|---|---|---|---|
| CN | 101845152 A | | 9/2010 | |
| CN | 102618010 A | * | 8/2012 | |
| CN | 104045964 A | | 9/2014 | |
| CN | 110698808 A | * | 1/2020 | ............. C08L 55/02 |
| CN | 111961309 A | | 11/2020 | |
| EP | 4289893 A1 | | 12/2023 | |
| JP | 6-8249 A | | 1/1994 | |
| JP | 8-20023 A | | 1/1996 | |
| JP | 2002-293983 A | | 10/2002 | |
| JP | 2007-023119 A | | 2/2007 | |
| JP | 4077147 B2 | | 4/2008 | |
| JP | 2016-199718 A | | 12/2016 | |
| KR | 10-1998-0032323 A | | 7/1998 | |
| KR | 10-2000-0018319 A | | 4/2000 | |
| KR | 10-2002-0056162 A | | 7/2002 | |
| KR | 10-2009-0089269 A | | 8/2009 | |
| KR | 10-2010-0094142 A | | 8/2010 | |
| KR | 10-2012-0014726 A | | 2/2012 | |
| KR | 10-2018-0092573 A | | 8/2018 | |
| KR | 10-2021-0066315 A | | 6/2021 | |
| KR | 10-2021-0119377 | | 10/2021 | |
| WO | 2021/151071 A1 | | 7/2021 | |

OTHER PUBLICATIONS

English translation of KR 10-2000-0018319. (Year: 2000).*
English translation of CN 102618010. (Year: 2012).*
English translation of CN 110698808. (Year: 2020).*
Leonardo M. dos Santos, Using Different Catalysts in the Chemical Recycling of Waste From Flexible Polyurethane Foams, vol. 23, No. 5, pp. 608-661, http://dx.doi.org/10.4322/polimeros.2013.096.
International Search Report and Written Opinion issued in corresponding International Patent Application No. PCT/KR2023/009381, dated Nov. 10, 2023.
Extended European Search Report dated Mar. 3, 2025 issued in application 23840870.2.

* cited by examiner

*Primary Examiner* — John J DeRusso
*Assistant Examiner* — Joseph S Leyson
(74) *Attorney, Agent, or Firm* — Morgan, Lewis & Bockius LLP

(57) ABSTRACT

Provided is a method for preparing a recycled ABS resin including: preparing an extrusion feed including an acrylonitrile butadiene styrene (ABS) base resin including polyurethane and a metal carboxylic acid salt or a hydrate of the metal carboxylic acid salt, and supplying the extrusion feed to an extruder to perform a depolymerization reaction of the polyurethane and extrude the extrusion feed, wherein a master index (M) value satisfies $0.2 \leq M \leq 0.6$.

9 Claims, No Drawings

METHOD FOR PREPARING RECYCLED ABS RESIN

CROSS-REFERENCE TO RELATED APPLICATIONS

The present application claims the benefit of priority to Korean Patent Application No. 10-2022-0121688, filed on Sep. 26, 2022, the entire contents of which are incorporated herein as a part of the specification.

TECHNICAL FIELD

The present invention relates to a method for preparing a recycled resin, in particular, a recycled ABS resin.

BACKGROUND ART

Recently, since plastics having various uses and physical properties required for purposes have been developed, the use of plastics is increasing. In general, plastics use a lot of energy from crude oil collection to manufacturing, and a large amount of carbon is discharged in the process. Furthermore, when final products are discarded and plastics included in the products are also discarded, social costs for environmental pollution by the plastics and the treatment thereof are consumed. Thus, it is essential to recycle discarded plastics for reducing energy consumption, reducing carbon emission, and preventing environmental pollution. As such, plastics manufactured by recycling plastics discarded after being used by a final consumer are referred to as post-consumer recycled (PCR) resin, and attempts and efforts to obtain PCR resin having desired purity and physical properties continue to be made.

Meanwhile, an acrylonitrile butadiene styrene (ABS) resin, which is a copolymer of acrylonitrile, butadiene, and styrene, is a plastic which is more resistant to impact and heat than general plastics and is a plastic raw material which easily implements beautiful appearance and various colors, and thus, is used as a material for a wide range of products such as home appliances, office equipment, automobile interior and exterior material, and toys. Due to an increase in products to which the ABS resin is applied, ABS resin usage has been rapidly increasing in recent years. Therefore, when products to which the ABS resin is applied are discarded, the need for recycling waste ABS resin included in the products is also increasing.

Meanwhile, a method for recycling waste plastic (resin) includes mechanical recycling, chemical recycling, and thermal recycling. The mechanical recycling is a method of crushing and selecting collected waste plastics, separating the waste plastics by type, melting the plastics to be pelletized, and mixing the plastics with a new material at a specific ratio to manufacture a resin product. The chemical recycling is a method of extracting only a specific polymer using various chemical means from waste plastics, or collecting and repolymerizing pure monomolecules. The thermal recycling is a method of burning waste plastics to recover plastics as heat energy.

When the waste ABS resin is treated by the mechanical recycling method, it is not easy to select the waste plastic as a single type. The waste plastics are usually separated by type by applying a series of methods such as specific gravity separation, optical selection/separation, fine selection, and magnetic selection stepwise. However, plastics which have been separated and selected usually include foreign matter at a level of 1 to 5%. The foreign matter is composed of various components such as paper, ceramic, different kind of plastic, carbides, metallic foreign matter, and dust. When waste ABS resin including various impurities as such is melted at a high temperature and pelletized, deformation of recycled resin or PCR resin prepared or deterioration of physical properties such as deterioration of surface properties may occur due to various impurities included in the waste ABS resin. In particular, in the case of recycled ABS resin obtained from large waste home appliances such as washing machines and refrigerators, it is impossible to separate adhesives such as urethane-based insulation and a problem of deteriorating surface properties is caused. The chemical recycling is a method of changing the molecular structure of recycled plastic itself to recycle it into a raw material, and in order to change a molecular structure already bound in the ABS resin which is a terpolymer again, the reaction and the process become difficult.

Therefore, the need for preparing a recycled ABS resin which has no deterioration of physical properties as compared with a new ABS resin before being applied to a product is emerging.

RELATED ART DOCUMENTS

Patent Documents (Patent Document 1) Korean Patent Registration No. 10-1985542

DISCLOSURE

Technical Problem

In order to solve the problems mentioned in the Background Art, an object of the present invention is to provide a method of preparing a recycled ABS resin which has almost no deterioration in appearance properties and an improved degree of deterioration of physical properties such as discoloration, even as compared to a new ABS resin.

Technical Solution

In one general aspect, a method for preparing a recycled ABS resin includes: preparing an extrusion feed including an acrylonitrile butadiene styrene (ABS) base resin including polyurethane and a metal carboxylic acid salt or a hydrate of the metal carboxylic acid salt, and supplying the extrusion feed to an extruder to perform a depolymerization reaction of the polyurethane and extrude the extrusion feed, wherein a master index (M) value calculated by the following Equation 1 satisfies $0.2 \le M \le 0.6$:

$$M = MRT * W * [\exp(-1/T)]^{10000} * 10^6 \quad \text{[Equation 1]}$$

wherein

MRT is a residence time (sec) of the extrusion feed in the extruder,

W is a content (part) of the metal carboxylic acid salt or the hydrate thereof in the extrusion feed, based on 100 parts by weight of the ABS base resin, and T is a temperature (K) of a melted extrudate discharged from the extruder.

Advantageous Effects

According to the method for preparing a recycled ABS resin of the present invention, in performing the depolymerization reaction of polyurethane included in the ABS base resin by reaction extrusion, a reaction rate of the depolymerization reaction may be increased by including the metal carboxylic acid salt or the hydrate of the metal carboxylic acid salt in the extrusion feed supplied to the extruder. Thus, a desired degree of the depolymerization of polyurethane may be achieved in spite of the short residence time.

Meanwhile, the residence time (MRT) of the extrusion feed in the extruder and the temperature (T) of the extrudate discharged from the extruder after the extrusion feed is reacted and extruded are controlled by the relationship with the content of the metal carboxylic acid salt or the hydrate of the metal carboxylic acid salt included in the extrusion feed, thereby efficiently performing the depolymerization reaction of polyurethane and preventing deterioration of depolymerization reactants including an ABS resin and the metal carboxylic acid salt or the hydrate of the metal carboxylic acid salt.

Thus, deterioration of surface properties of the recycled ABS resin by polyurethane and other impurities may be prevented and a recycled ABS resin having minimized deformation of physical properties such as color properties may be obtained.

BEST MODE FOR CARRYING OUT THE INVENTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In the present invention, an ABS resin or an ABS (co) polymer is a concept which collectively refers to not only a resin or a (co)polymer including a conjugated diene-based compound-derived unit, an aromatic vinyl compound-derived unit, and a vinyl cyanide compound-derived unit, but also a resin composition and a (co)polymer composition including the resin or the (co)polymer.

Meanwhile, in the present invention, an ABS base resin, which is an ABS resin which is separated and recovered from discarded products and pretreated, refers to an ABS resin including impurities or foreign matter, and a resin prepared from the ABS base resin by the method for preparing a recycled resin of the present invention is defined as a recycled ABS resin. Furthermore, an ABS resin which is in a state of a mixture of a recycled ABS resin and a new material for applying the recycled ABS resin to a product or in a state with an additive added for imparting desired physical properties is referred to as a post consumer recycled-ABS (PCR-ABS) resin.

Hereinafter, the present invention will be described in more detail for better understanding of the present invention.

A method for preparing a recycled ABS resin according to an exemplary embodiment of the present invention may include: preparing an extrusion feed including an acrylonitrile butadiene styrene (ABS) base resin including polyurethane and a metal carboxylic acid salt or a hydrate of the metal carboxylic acid salt, and supplying the extrusion feed to an extruder to perform a depolymerization reaction of the polyurethane and extrude the extrusion feed.

First, the ABS resin according to the present invention may be a polymer including a conjugated diene-based compound-derived unit, an aromatic vinyl compound-derived unit, and a vinyl cyanide compound-derived unit. As an example, the ABS resin may be prepared by graft-polymerizing an aromatic vinyl compound and a vinyl cyanide compound onto a conjugated diene-based rubbery polymer. In this case, the ABS resin may include 30 to 60 parts by weight of the aromatic vinyl compound and 10 to 30 parts by weight of the vinyl cyanide compound with respect to 100 parts by weight of the rubbery polymer.

The conjugated diene-based rubbery polymer is preferably at least one selected from the group consisting of a butadiene rubbery polymer, an isoprene rubbery polymer, a chloroisoprene rubbery polymer, and any mixture thereof. The aromatic vinyl compound is preferably at least one selected from the group consisting of styrene, α-methylstyrene, para-methylstyrene, o-ethylstyrene, para-ethylstyrene, and vinyltoluene, and more preferably styrene. The vinyl cyanide compound is preferably at least one selected from the group consisting of acrylonitrile, methacrylonitrile, and ethacrylonitrile, and more preferably acrylonitrile.

The ABS resin has excellent properties such as impact strength, tensile strength, elastic modulus, and flame retardancy and is widely used for home appliances such as refrigerators, automobile parts, various electrical/electronic parts, and the like. For example, when the ABS resin is used as a material of an exterior frame inside and outside a refrigerator, it is common to provide a foam-filled polyurethane foam (PU foam) in a closed space between the exterior frame outside and the exterior frame inside the refrigerator for insulation of the exterior frame, thereby maintaining a cooling temperature inside. When the product using both the ABS resin and polyurethane as such is discarded and a recycled ABS resin is prepared from the waste ABS resin, it is not easy to separate the waste ABS resin and polyurethane due to their strong adhesion. Foreign matter such as polyurethane remaining in the recycled ABS resin is a factor deteriorating the physical properties of the recycled ABS resin or an extruded product manufactured therefrom. In particular, deterioration of surface properties such as a non-uniform gel or a dimple shape may occur on the surface of the product.

Conventionally, it was intended that the waste ABS was filtered using a mesh screen to remove the foreign matter such as polyurethane, but the foreign matter often passed through the mesh screen due to the flexible shape changeability (flexibility) of the polyurethane foam itself, and thus, it was impossible to prepare a recycled ABS resin having high reliability. Therefore, a lot of new materials should be mixed for securing the physical properties of the ABS resin which were deteriorated due to the foreign matter, and the recycling rate of the recycled ABS resin in the product was limited.

Thus, the present invention is intended to provide a method in which in supplying an ABS base resin including foreign matter such as polyurethane to an extruder, a metal carboxylic acid salt or a hydrate thereof is supplied together, thereby promoting an effective depolymerization reaction for the polyurethane and minimizing an influence such as an aggregation effect of polyurethane on other foreign matters, and thus, a recycled ABS resin having highly reliable physical properties may be prepared.

First, the extruder according to an exemplary embodiment of the present invention has a function of melting, kneading, and extruding the ABS base resin, and also performs a function of performing the depolymerization reaction of polyurethane included in the ABS base resin in the extruder and uniformly dispersing the decomposed product of the depolymerized polyurethane. Specifically, the extruder may be a twin screw extruder.

The extruder may include a supply port to which the extrusion feed is supplied, an outlet positioned in the other end of the supply port, through which an extrudate is discharged, a cylinder in a housing of the extruder, in which the extrusion feed is extruded, a screw which is positioned inside the cylinder and pushes the extrusion feed or the extrudate in the direction of outlet by rotation drive, and a heating device which is provided in the outside of the cylinder and heats the cylinder.

Meanwhile, the extrusion feed may be supplied to the inlet of the extruder in one composition form, and one or more of the components included in the extrusion feed may be supplied through a separate supply line.

Meanwhile, according to an exemplary embodiment of the present invention, an extrusion feed for reaction extrusion in the extruder may be prepared. Herein, the extrusion feed may include an acrylonitrile butadiene styrene (ABS) base resin including polyurethane, a metal carboxylic acid salt, or a hydrate of the metal carboxylic acid salt. For example, the extrusion feed may be a composition including the acrylonitrile butadiene styrene (ABS) base resin, a metal carboxylic acid salt, or a hydrate of the metal carboxylic acid salt.

The ABS base resin is an ABS resin in a state of being required to be supplied to an extruder, and for example, may be an ABS resin in the form of a flake or particle (pellet or fine powder) having an appropriate size in a state in which large-sized foreign matter has been separated and removed. To this end, a pretreatment of a waste ABS resin may be performed as needed to first prepare an ABS base resin in the form of a flake or particle (pellet or fine powder).

Specifically, in order to prepare the ABS base resin, first, a waste product containing the waste ABS resin is disassembled, the waste ABS resin is separated, and then washed and crushed. In order to separate the waste ABS resin from other resins such as polypropylene (PP), polystyrene (PS), and high impact polystyrene (HIPS), a method such as a wet or dry separation method using specific gravity, a screening classification method using a near infrared spectrometer, and electrostatic separation using electrostatic properties may be used. Foreign matter other than resin, for example, metal components or fiber components may be first separated from a waste ABS resin in a crushed state, and for this, magnetism or difference in specific gravity of a material may be used. Thus, large foreign matter in the waste ABS resin is removed to decrease a total content of foreign matter.

Thereafter, if necessary, the waste ABS resin from which large foreign matter has been removed is pulverized to make a fine powder or flake phase. The pulverization may be performed using a pulverizing device such as, for example, a jaw crusher, an impact crusher, a cross jet mill, a roller mill, and a rod mill. Meanwhile, the waste ABS resin after pulverization may still include some foreign matter.

Furthermore, in order to remove some fine foreign matter included in the waste ABS resin in a pulverized state, equipment using for example, magnetic force, wind force, centrifugal force, gravity, and the like may be used to separate and remove fine foreign matter.

By the pretreatment as such, an ABS base resin in an appropriate state of being supplied to the extruder from the waste ABS resin included in the waste product may be prepared. Meanwhile, each process exemplified by the pretreatment of the waste ABS may be appropriately selected and modified as needed, and is not particularly limited as long as it is a means to provide an ABS base resin in an appropriate state to be supplied to an extruder.

In the ABS base resin, a trace amount of foreign matter may be included. For example, the foreign matter may include various impurities such as a trace amount of fiber material, resin material, stone material, and metal material in addition to polyurethane. The content of the foreign matter may be less than 0.5 wt % with respect to the ABS base resin. When the ABS base resin including the foreign matter even in a small amount is supplied to the extruder without a separate treatment and extruded, the physical properties, in particular, surface properties of the recycled ABS resin, may be deteriorated. Specifically, deterioration of surface properties, such as occurrence of gel or dimple marks on the surface of the recycled ABS resin or a molded article manufactured therefrom may be problematic. This may be direct deterioration of surface properties by polyurethane present on the surface of the ABS base resin, and additionally, may be an effect of the impurities mediated by polyurethane in the foreign matter.

Therefore, in order to prevent the deterioration of surface properties of the recycled ABS resin due to polyurethane and impurities included in the ABS base resin, the effect of polyurethane on the recycled ABS resin needs to be minimized by efficiently depolymerizing polyurethane in an extrusion process performed in the extruder. From this perspective, the extrusion feed of the present invention may include a metal carboxylic acid salt or a hydrate of the metal carboxylic acid salt.

The depolymerization reaction may refer to a reaction which breaks a part of the urethane bonds of polyurethane. The depolymerization reaction may not be a reaction which completely decomposes polyurethane into a monomer state, and may refer to a reaction which a high molecular weight polyurethane is decomposed into a low molecular weight polyurethane. Therefore, a decomposition product of the depolymerization reaction of polyurethane includes polyurethane having a smaller molecular weight than polyurethane as a reactant of the depolymerization reaction, and if necessary, may include monomers and oligomers forming the polyurethane.

The metal carboxylic acid salt or the hydrate of the metal carboxylic acid salt serves to promote the depolymerization of polyurethane included in the ABS base resin in the reaction extrusion process. Since the polyurethane causes gels or dimples on the surface of the recycled ABS resin by itself or with other impurities, the metal carboxylic acid salt or the hydrate thereof may be added to the extrusion feed to sufficiently proceed with the promoted depolymerization of polyurethane, and thus, the surface properties of the recycled ABS resin prepared by reaction extrusion may be improved.

Furthermore, since the reaction extrusion in the extruder is performed under a high temperature atmosphere, a heat exposure time of the ABS base resin needs to be minimized in order to prepare a recycled ABS resin having less change in physical properties, and despite the short residence time of the extrusion feed in the extruder, the depolymerization reaction of polyurethane in the ABS base resin may be performed rapidly and sufficiently by adding the metal carboxylic acid salt or the hydrate thereof.

The metal element of the metal carboxylic acid salt or the hydrate of the metal carboxylic acid salt may be potassium and zinc. The carboxylic acid salt or the hydrate thereof of the metal element such as sodium and magnesium does not cause a sufficient urethane decomposition reaction to decrease a foreign matter reduction effect.

The content of the metal carboxylic acid salt or the hydrate thereof included in the extrusion feed may be 0.05 parts to 2 parts, specifically 0.1 parts to 1 part, and more specifically 0.15 parts to 0.6 parts with respect to 100 parts of the ABS base resin weight. Only when the content is at least 0.05 parts or more with respect to 100 parts of the ABS base resin weight, the expected effect of promoting the depolymerization reaction of polyurethane by the addition of the metal carboxylic acid salt and the hydrate thereof may be obtained. Meanwhile, only when the content of the metal carboxylic acid salt is 2 parts or less with respect to 100 parts of the ABS base resin weight, an effect of the metal carboxylic acid salt and the hydrate thereof on the physical properties such as color properties of the recycled ABS resin in the extrusion process and the deterioration of the physical properties due to remaining of the metal carboxylic acid salt and the hydrate thereof in the recycled ABS resin may be decreased.

Meanwhile, the carboxylate anion of the metal carboxylic acid salt may be an aliphatic or aromatic carboxylate having 2 to 18 carbon atoms, preferably 2 to 12 carbon atoms. Specifically, the metal carboxylic acid salt may be an aliphatic carboxylate of zinc such as zinc acetate, zinc propionate, zinc butyrate, zinc octoate, zinc decanoate, zinc laurate, and zinc stearate. Meanwhile, the metal carboxylic acid salt may be an aliphatic carboxylate of potassium such as potassium acetate, potassium propionate, potassium butyrate, potassium octoate, potassium decanoate, potassium laurate, and potassium stearate. More specifically, the metal carboxylic acid salt may be zinc acetate or potassium acetate. One or two or more of the metal carboxylic acid salt may be used within the content range described above.

In addition, the metal carboxylic acid salt forming the hydrate of the metal carboxylic acid salt may be the same type as the metal carboxylic acid salt described above. The specific hydrate of the metal carboxylic acid salt may be a hydrate of zinc acetate or a hydrate of potassium acetate, and specifically, may be zinc acetate dihydrate or potassium acetate hydrate. Also, one or two or more of the hydrate of the metal carboxylic acid salt may be used within the content range described above.

The metal carboxylic acid salt or the hydrate of the metal carboxylic acid salt has an excellent effect of accelerating a depolymerization reaction rate of polyurethane of the polyhydric alcohol, and in particular, among the metal carboxylic acid salts, zinc acetate or the hydrate thereof and potassium acetate or the hydrate thereof are less of a structural hindrance in the depolymerization reaction and have excellent mobility due to their simple structure, and thus, may be preferred.

Meanwhile, when the hydrate of the metal carboxylic acid salt is included in the extrusion feed, hydrolysis of polyurethane may be induced without including separate water in the extrusion feed, and thus, the depolymerization of polyurethane may be performed more smoothly. Furthermore, since no liquid water needs to be added to the extrusion feed, aggregation of components included in the extrusion feed may be prevented, thereby improving extrusion processing productivity. In addition, since a device such as an additional liquid feed supply device may be omitted, facilities may be simplified.

According to an exemplary embodiment of the present invention, in order to promote the depolymerization reaction of polyurethane included in the ABS base resin, the extrusion feed may further include a polyhydric alcohol.

As described later, a temperature inside the extruder for extruding the ABS base resin may be 200 °C to 280 °C, and the polyhydric alcohol may be a polyhydric alcohol having a boiling point at or above the temperature inside the extruder.

A specific example of the polyhydric alcohol may comprise at least one selected from glycerin, erythritol, ethylene glycol, diethylene glycol, triethylene glycol, and polyethylene glycol.

Specifically, referring to the following Table 1, it is shown that among low molecular weight primary alcohols (for example, methanol, ethanol, and the like) or secondary alcohols, ethylene glycol and the like are alcohols having a boiling point lower than 200 °C. When the alcohol having a low boiling point is used, the amount of alcohol vaporized in the extruder is increased as described above and the amount of the polyhydric alcohol participating in the real reaction is decreased, and thus, an efficient depolymerization reaction is difficult, or a backflow phenomenon occurs in an extruder inlet area to cause productivity decline.

Meanwhile, even in the case of an alcohol having a somewhat high boiling point, a high molecular weight primary alcohol (for example, stearyl alcohol and the like), diethylene glycol, triethylene glycol, or the like does not have a high ratio of an OH group to mass, and thus, the effect of the depolymerization reaction of polyurethane may be limited. That is, the alcohols as such may be preferred in terms of the amount vaporized inside the extruder, but may be limited in terms of the depolymerization reaction efficiency of polyurethane.

Furthermore, since a polyhydric alcohol such as arabitol, mannitol, sorbitol, xylitol, and maltitol is a solid phase and has poor compatibility with an ABS resin, it may act as another foreign matter, and thus, may not be preferred.

TABLE 1

| | Molecular weight (g/mol) | Number of OH groups per one molecule | OH group equivalent weight to mass[(1)] | Boiling point (°C) |
|---|---|---|---|---|
| Methanol (MeOH) | 32 | 1 | 1 | 64.7 |
| Ethanol (EtOH) | 46 | 1 | 0.695 | 78.37 |
| Stearyl alcohol (StOH) | 270 | 1 | 0.118 | 210 |
| Ethylene glycol (EG) | 62 | 2 | 1.032 | 197 |
| Diethylene glycol (DEG) | 106 | 2 | 0.604 | 244 |
| Triethylene glycol (TEG) | 150 | 2 | 0.427 | 285 |
| Polyethylene glycol (PEG) | 4000 (Weight average molecular weight) | 2 | 0.008 | — |
| Glycerin (GLY) | 92 | 3 | 1.044 | 290 |
| Erythritol | 122 | 4 | 1.049 | 330.5 |
| Xylitol | 152 | 5 | 1.053 | 216 |
| Polyvinyl alcohol (PVOH) | 44 (per repeating unit) | 1 | 0.728 | — |

(1)OH group equivalent weight to mass: a value obtained by dividing the number of OH groups per one molecule by a molecular weight, which is represented by a relative value compared with the case in which methanol is 1.

As described above, as the polyhydric alcohol, at least one selected from glycerin and erythritol may be preferably applied among the alcohols described above, considering the boiling point (degree of vaporization in an extruder), the ratio of OH group to mass (efficiency of depolymerization reaction), the compatibility with an ABS resin, and the like collectively.

Meanwhile, the content of the polyhydric alcohol in the extrusion feed may be 0.01 parts to 3 parts, specifically 0.1 parts to 0.9 parts with respect to 100 parts of the ABS base resin weight.

When the content of the polyhydric alcohol is less than 0.01 parts by weight, the urethane decomposition reaction is not sufficient so that a foreign matter reduction effect is decreased, and when the content of the polyhydric alcohol is more than 3 parts by weight, mechanical properties such as impact strength are deteriorated.

Meanwhile, according to an exemplary embodiment of the present invention, the relationship among the content of the metal carboxylic acid salt or the hydrate thereof in the extrusion feed, the residence time of the extrusion feed in the extruder, and the temperature of the melted extrudate discharged from the extruder may be controlled so that the master index (M) value calculated by Equation 1 satisfies 0.2≤M≤0.6:

$$M = MRT * W * [\exp(-1/T)]^{10000} * 10^6 \quad \text{[Equation 1]}$$

wherein MRT is a residence time (sec) of the extrusion feed in the extruder, W is a content (part) of the metal carboxylic acid salt or the hydrate thereof in the extrusion feed, based on 100 parts by weight of the ABS base resin, and T is a temperature (absolute temperature K) of a melted extrudate discharged from the extruder.

When the range of the master index (M) satisfies 0.2≤M≤0.6, depolymerization of polyurethane which causes deterioration of surface properties of the recycled resin may be appropriately performed, and deterioration of the recycled resin or the metal carboxylic acid salt or the hydrate of the metal carboxylic acid salt by heat is prevented to prepare the regenerated resin having good physical properties. In the present invention, in preparing a recycled ABS resin by reaction extrusion, the relationship among the factors of the content of the metal carboxylic acid salt or the hydrate of the metal carboxylic acid salt in the extrusion feed, the residence time of the extrusion feed in the extruder, and the temperature of the melted extrudate discharged from the extruder is controlled by the master index (M), thereby setting optimal conditions for preparing the recycled ABS resin by reaction extrusion.

Specifically, when the master index (M) is less than 0.2, the surface properties of the prepared recycled ABS resin or a molded article manufactured therefrom may be deteriorated, and when the master index (M) is more than 0.6, the prepared recycled ABS resin or the molded article manufactured therefrom may be discolored or have a larger color difference, and thus, it may be difficult to maintain the original color of the ABS resin.

The factors described in Equation 1 will be described in more detail.

First, the extrusion feed is supplied through a supply port of the extruder, and the supplied extrusion feed may be transferred toward an outlet by rotation drive of a screw inside the cylinder. In this process, the ABS base resin is melted by heating by heat supplied from a heating device, and may be uniformly mixed with the metal carboxylic acid salt or the hydrate thereof and other additives and extruded. Meanwhile, in the process of extruding the extrusion feed in the extruder as described above, the depolymerization reaction of polyurethane included in the ABS base resin is simultaneously performed to perform a so called reaction extrusion process.

The temperature (T) of the melted extrudate discharged from the extruder may be 220 °C to 290 °C, more specifically 245 °C to 270 °C. Meanwhile, the temperature of the melted extrudate discharged from the extruder is a temperature of the extrudate in a melted state discharged from an outlet (die) of the extruder, and measured with an infrared thermometer.

The temperature (T) of the melted extrudate discharged from the extruder as such needs to be set at a temperature of a melting point or higher of the ABS base resin and a heat deterioration temperature or lower, and the temperature range is a temperature above the extrusion temperature for conventionally preparing the recycled ABS resin. When the ABS base resin stays for a long time in the extruder at the temperature, the ABS base resin is prone to deterioration and discoloration by heat, which is directly related to the deterioration of physical properties such as color properties of the recycled ABS resin. Furthermore, when the reaction feed stays for a long time in the extruder, the amount of the metal carboxylic acid salt deactivated by heat is increased, resulting in the deterioration of efficiency of the depolymerization reaction of polyurethane. That is, as the extrusion temperature is higher, the depolymerization reaction of polyurethane easily occurs, but when the extrusion feed is exposed to the high temperature for a long time, the problems described above arise, and thus, the efficiency of the depolymerization reaction may be rather deteriorated. Therefore, when the temperature (T) of the extrudate discharged from the extruder is maintained at 220 °C to 290 °C, it is important to minimize the side effect of heat by making the residence time of the extrusion feed in the extruder short, and in order to perform the depolymerization reaction of polyurethane to a desired level even with the short time, the use of the metal carboxylic acid salt or the hydrate thereof is essential.

Meanwhile, according to the method for preparing a recycled ABS resin of the present invention, the residence time (MRT) of the extrusion feed in the extruder may be 30 seconds to 400 seconds, specifically 100 seconds to 300 seconds, and more specifically 120 seconds to 240 seconds. Herein, the residence time (MRT) is a period from a time when the extrusion feed is supplied to the supply port of the extruder to a time when the extrudate is discharged through the outlet of the extruder, and means a period during which the extrusion feed stays in the extruder. Herein, the residence time of the extrusion feed may be controlled by controlling a rotation speed of a screw which pushes the extrusion feed.

By the short residence time as such, the time during which the ABS base resin, the metal carboxylic acid salt, or the hydrate thereof supplied to the extruder is exposed to heat is minimized, thereby deterioration preventing of physical properties such as discoloration of the recycled ABS resin by heat, activity degradation by the deterioration of the metal carboxylic acid salt or the hydrate thereof, and the like. Also, efficient depolymerization of polyurethane in the ABS base resin is possible even with a short residence time, by adopting the metal carboxylic acid salt or the hydrate thereof for reaction extrusion. In addition, since the decomposition product by the depolymerization includes polyurethane having a sufficiently lowered molecular weight, the decomposition product may be uniformly distributed in the melted and kneaded recycled resin. Thus, it is eventually possible to prepare the recycled ABS resin having good physical properties, for example, good surface properties.

Meanwhile, pressure inside the extruder according to an exemplary embodiment of the present invention may be a normal pressure to 100 bar or less. Within the pressure range, it is easy to control the temperature inside the extruder, and the melting and kneading of the ABS base resin may be preferably performed. In particular, within the pressure range, an efficient depolymerization reaction to polyurethane may be performed.

According to an exemplary embodiment of the present invention, the extrudate discharged from the extruder may be supplied to a pelletizer and pelletized. For example, the extrudate discharged through an outlet of the extruder is molded to a desired size by an underwater pelletizer and cooled, thereby finally preparing the recycled ABS resin.

MODE FOR CARRYING OUT THE INVENTION

Hereinafter, the present invention will be described in more detail by the examples. However, the following examples are provided for illustrating the present invention, and it is apparent to a person skilled in the art that various modifications and alterations may be made without departing from the scope and spirit of the present invention, and the scope of the present invention is not limited thereto.

Example 1

A waste ABS resin recovered from a refrigerator was pulverized and classified, large-sized foreign matter was removed by separation in the process, and crushing was performed to prepare an ABS base resin including polyurethane having an average particle diameter (D50) of 15 mm. 100 kg of the ABS base resin and 0.3 kg of potassium acetate (KAc) as a metal carboxylic acid salt were supplied to a mixer and mixed to prepare an extrusion feed, which was supplied to an extruder through an extruder supply port.

As the extruder, a twin screw extruder including a cylinder having an inner diameter of 25 mm and having a screw length of 800 mm was used.

Melting and kneading of the ABS base resin were performed in the extruder and also the depolymerization reaction of polyurethane included in the ABS base resin was performed.

At this time, a screw rotation speed was set to 300 rpm to control the residence time of the extrusion feed in the extruder to 120 seconds, and after the reaction extrusion, the extrudate was discharged through an outlet of the extruder. When discharged from the outlet, the extrudate was in a melted state, and the temperature measured by an infrared thermometer was 260 °C (533K).

Subsequently, the extrudate was supplied to a pelletizer to prepare a recycled ABS resin having a diameter of 2 mm.

In this case, the master index (M) calculated by Equation 1 was 0.26.

Examples 2 to 11 and Comparative Examples 1 to 14

A recycled ABS resin was prepared in the same manner as in Example 1, except that the temperature (T) of the melted extrudate discharged from the extruder, the residence time (MRT) of the extrusion feed in the extruder, the type and the content of the metal carboxylic acid salt or the hydrate thereof included in the extrusion feed, the residence time thereof, and the discharge temperature of the extrudate were as listed in Tables 2 to 5.

In particular, in Example 7, potassium acetate hydrate was used instead of potassium acetate (KAc), in Examples 8 to 10, zinc acetate (ZnAc) was used instead of potassium acetate (KAc), and in Example 11, zinc acetate dihydrate was used instead of potassium acetate (KAc), as compared with Example 1, and they were used at the contents described in Tables 2 and 3.

Meanwhile, Comparative Examples 1 to 14 are examples in which the master index (M) was changed by changing the type and the content of the carboxylic acid salt and the hydrate thereof, the residence time thereof, and the discharge temperature of the extrudate. Specifically, in Comparative Examples 1 and 8, the metal carboxylic acid salt was not used, in Comparative Examples 2 to 7, potassium acetate (KAc) was used, and in Comparative Examples 9 to 14, zinc acetate (ZnAc) was used at the contents described in Tables 4 and 5.

Experimental Example

The physical properties of the recycled ABS resins prepared in the examples and the comparative examples were measured and evaluated by the following methods, and the results are shown in Tables 2 to 5.

1. Number of Film Gels (Film Foreign Matter Score)

The recycled ABS resin pellet prepared was blended with a styrene-acrylonitrile (SAN)-based copolymer at a mass ratio of 1:9, and then a film specimen having a thickness of 0.02 mm was prepared by extrusion using a separate extruder. Here, the styrene-acrylonitrile (SAN)-based copolymer resin was prepared by mixing 70 parts by weight of styrene, 30 parts by weight of acrylonitrile, 20 parts by weight of ethylbenzene as a solvent, and 0.15 parts by weight of t-dodecylmercaptan as a molecular weight modifier, and continuously adding the mixture to a reaction tank to perform polymerization at a reaction temperature of 148 °C.

Thereafter, a Q-film software available from Collin was used to count the number of gels in the film. At this time, gels were determined as gels having a diameter of 100 μm or more and fiber in the prepared film specimen and counted, but the number of gels was counted for each size range divided by gel diameters of 100 μm or more and less than 300 μm, 300 μm or more and less than 500 μm, and 500 μm or more, and depending on the number of measured gels, gels of 100 μm or more and less than 300 μm were evaluated as 0.03, gels of 300 μm or more and less than 500 μm were evaluated as 0.05, and gels of 500 μm or more were evaluated as 0.1, thereby calculating the film foreign matter scores.

2. Color Difference

It was measured using a colorimeter (instrument name: Ci7860 available from X-Rite). Herein, a reference was ABS flakes having L, a, and b values of 87.85, −1.27, and 4.23, respectively. ΔL, Δa, and Δb values which are differences between L, a, and b values of the reference and L, a, and b values of the recycled ABS resin specimen prepared in each example and comparative example were calculated, and ΔE was calculated from the following equation:

$$\Delta E = (\text{color difference}) = (\Delta L^2 + \Delta a^2 + \Delta b)^{1/2}$$

In the equation, L is a L value of a color coordinate in accordance with the L*a*b* color system, and has a value of 0 to 100; as L is closer to 0, a black color is shown, and as L is closer to 100, a white color is shown. a has a value of −100 to 100; as a is closer to −100, a green color is shown, and as a is close to 100, a red color is shown. b has a value of −100 to 100; as b is closer to −100, a blue color is shown, and as b is close to 100, a yellow color is shown.

The film foreign matter score and the color difference for each of the examples and the comparative examples are shown in Tables 2 to 5.

TABLE 2

| | Example 1 | Example 2 | Example 3 | Example 4 | Example 5 | Example 6 |
|---|---|---|---|---|---|---|
| Added amount (phr) | 0.3 | 0.15 | 0.3 | 0.3 | 0.6 | 0.3 |
| Residence time (sec) | 120 | 240 | 240 | 240 | 120 | 240 |
| Extrudate temperature (°C) | 260 | 260 | 248.5 | 250.5 | 260 | 263.5 |
| Extrudate temperature (K) | 533 | 533 | 521.5 | 523.5 | 533 | 536.5 |
| Master index (M) | 0.26 | 0.26 | 0.34 | 0.36 | 0.51 | 0.58 |

TABLE 2-continued

| | Example 1 | Example 2 | Example 3 | Example 4 | Example 5 | Example 6 |
|---|---|---|---|---|---|---|
| Film foreign matter score | 11.5 | 10.5 | 10.1 | 10 | 10.1 | 11 |
| ΔE | 1.8 | 1.45 | 1.91 | 1.87 | 1.74 | 2.12 |

TABLE 3

| | Example 7 | Example 8 | Example 9 | Example 10 | Example 11 |
|---|---|---|---|---|---|
| Added amount (phr) | 0.3 | 0.4 | 0.15 | 0.6 | 0.4 |
| Residence time (s) | 240 | 120 | 240 | 120 | 120 |
| Extrudate temperature (°C) | 249.5 | 260 | 270 | 260 | 262 |
| Extrudate temperature (K) | 522.5 | 533 | 543 | 533 | 535 |
| Master index (M) | 0.35 | 0.34 | 0.36 | 0.51 | 0.37 |
| Film foreign matter score | 9.8 | 9.6 | 11 | 8.8 | 9.1 |
| ΔE | 1.71 | 1.75 | 1.87 | 2.21 | 1.74 |

TABLE 4

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Added amount (phr) | 0 | 0.15 | 0.15 | 0.15 | 0.3 | 0.6 | 0.6 |
| Residence time (s) | 120 | 120 | 240 | 240 | 240 | 120 | 120 |
| Extrudate temperature (°C) | 260 | 254 | 242 | 247.5 | 267 | 274.4 | 277 |
| Extrudate temperature (K) | 533 | 527 | 515 | 520.5 | 540 | 547.7 | 550 |
| Master index (M) | 0 | 0.1 | 0.13 | 0.16 | 0.65 | 0.85 | 0.9 |
| Film foreign matter score | 93.8 | 59 | 42 | 33 | 10.7 | 10.3 | 10.6 |
| ΔE | 0 | 0.3 | 0.79 | 0.79 | 5.01 | 7.7 | 8.3 |

TABLE 5

| | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Added amount (phr) | 0 | 0.15 | 0.2 | 0.2 | 0.6 | 0.6 | 0.3 |
| Residence time (s) | 240 | 120 | 120 | 120 | 240 | 120 | 240 |
| Extrudate temperature (°C) | 265 | 254 | 253 | 260 | 247.5 | 272 | 275 |
| Extrudate temperature (K) | 538 | 527 | 526 | 533 | 520.5 | 545 | 548 |
| Master index (M) | 0 | 0.1 | 0.13 | 0.17 | 0.65 | 0.78 | 0.86 |

TABLE 5-continued

| | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Film foreign matter score | 88.7 | 59 | 51 | 33 | 10.4 | 10.2 | 10.7 |
| ΔE | 0 | 0.65 | 0.98 | 0.98 | 4.3 | 6.9 | 8.34 |

Referring to Tables 2 to 5, in preparing the recycled ABS resin by reaction extrusion of the ABS base resin including polyurethane, it was shown that when the metal carboxylic acid salt or the hydrate of the metal carboxylic acid salt was included in the reaction extrusion feed, the surface properties of the recycled ABS resin were improved.

Furthermore, in the examples in which the metal carboxylic acid salt or the hydrate of the metal carboxylic acid salt was used in a specific content range to control the residence time of the extrusion feed in the extruder and the discharge temperature of the extrudate simultaneously to adjust the master index (M) to 0.2 to 0.6, it was shown that deterioration of surface properties was prevented and the color properties were excellently expressed.

However, in Comparative Examples 1 to 4 and 8 to 11 in which the metal carboxylic acid salt or the hydrate of the metal carboxylic acid salt was used at a similar content to that of the examples, but the master index (M) was controlled to less than 0.2, the surface properties of the prepared recycled resin were deteriorated, and in Comparative Examples 5 to 7 and 12 to 14 in which the master index (M) was controlled to more than 0.6, deterioration of physical properties such as color properties was confirmed.

The invention claimed is:

1. A method for preparing a recycled acrylonitrile butadiene styrene (ABS) resin, the method comprising:

preparing an extrusion feed including (i) an acrylonitrile butadiene styrene (ABS) base resin including polyurethane and (ii) a metal carboxylic acid salt or a hydrate of the metal carboxylic acid salt, and supplying the extrusion feed to an extruder to perform a depolymerization reaction of the polyurethane and extrude the extrusion feed to form an extrudate discharged from the extruder, wherein a master index (M) value calculated by Equation 1 satisfies 0.2≤M≤0.6:

$$M=MRT*W*[\exp(-1/T)]^{10000}*10^6 \quad \text{[Equation 1]}$$

wherein

MRT is a residence time, seconds, of the extrusion feed in the extruder,

W is a content, in parts by weight, of the metal carboxylic acid salt or the hydrate of the metal carboxylic acid salt in the extrusion feed, based on 100 parts by weight of the ABS base resin, and T is a temperature, K, of the extrudate in a melted state, wherein MRT is 120 seconds to 240 seconds.

2. The method for preparing a recycled ABS resin of claim 1, wherein the metal carboxylic acid salt comprises at least one selected from zinc acetate and potassium acetate.

3. The method for preparing a recycled ABS resin of claim 1, wherein the hydrate of the metal carboxylic acid salt comprises at least one selected from a hydrate of zinc acetate and a hydrate of potassium acetate.

4. The method for preparing a recycled ABS resin of claim 1, wherein W is 0.05 parts by weight to 2 parts by weight with respect to 100 parts by weight of the ABS base resin.

5. The method for preparing a recycled ABS resin of claim 1, wherein W is 0.1 parts by weight to 1 part by weight with respect to 100 parts by weight of the ABS base resin.

6. The method for preparing a recycled ABS resin of claim 1, wherein the temperature of the extrudate is 220 °C to 290 °C.

7. The method for preparing a recycled ABS resin of claim 1, wherein the extrusion feed further includes a polyhydric alcohol, and a content of the polyhydric alcohol is 0.01 parts by weight to 3 parts by weight with respect to 100 parts by weight of the ABS base resin.

8. The method for preparing a recycled ABS resin of claim 7, wherein the polyhydric alcohol comprises at least one selected from glycerin and erythritol.

9. The method for preparing a recycled ABS resin of claim 1, further comprising, after the performing of the depolymerization reaction of the polyurethane and the extruding of the extrusion feed, supplying the extrudate to a pelletizer to perform pelletization.

* * * * *